(12) United States Patent
Larsen et al.

(10) Patent No.: US 6,715,095 B1
(45) Date of Patent: Mar. 30, 2004

(54) METHOD AND CIRCUITRY FOR SWITCHING FROM A SYNCHRONOUS MODE OF OPERATION TO AN ASYNCHRONOUS MODE OF OPERATION WITHOUT ANY LOSS OF DATA

(75) Inventors: Troy Larsen, North Ogden, UT (US); Martin Culley, Ogden, UT (US)

(73) Assignee: Iomeca Corporation, San Diego, CA (US)

( * ) Notice: Subject to any disclaimer, the term of this patent is extended or adjusted under 35 U.S.C. 154(b) by 635 days.

(21) Appl. No.: 09/677,390

(22) Filed: Oct. 2, 2000

(51) Int. Cl.[7] ................................................ G06F 1/32
(52) U.S. Cl. ..................... 713/600; 713/324; 713/601
(58) Field of Search .............................. 713/300, 320, 713/322, 324, 600, 601; 710/305, 306, 313

(56) References Cited

U.S. PATENT DOCUMENTS

| | | | | |
|---|---|---|---|---|
| 5,796,992 A | * | 8/1998 | Reif et al. .................. | 713/500 |
| 5,912,572 A | | 6/1999 | Graf .......................... | 327/144 |
| 5,958,055 A | * | 9/1999 | Evoy et al. .................. | 713/310 |
| 6,075,830 A | | 6/2000 | Piiraninen .................... | 375/354 |
| 6,084,447 A | | 7/2000 | Graf .......................... | 327/144 |
| 6,567,921 B1 | * | 5/2003 | Guziak ....................... | 713/322 |

FOREIGN PATENT DOCUMENTS

EP            899908 A1 * 3/1999 ........... H04L/12/12

OTHER PUBLICATIONS

"On Line Performance Measurement." IBM Technical Disclosure Bulletin, May 1, 1992, US, pp. 319–322.*

* cited by examiner

Primary Examiner—Thomas Lee
Assistant Examiner—Paul Yanchus, III
(74) Attorney, Agent, or Firm—James T. Hagler

(57) ABSTRACT

An integrated circuit chip that receives data on an asynchronous communications bus from an external device and receives data from asynchronous internal device is capable of switching from synchronous operation to asynchronous operation without any loss of data. The chip does not switch off the system clock while there is activity on the communications bus. Additionally, the communications bus has a minimum event time greater than the time fo one and a half cycles of the system clock plus enough timing margin for an asynchronous update to occur.

7 Claims, 2 Drawing Sheets

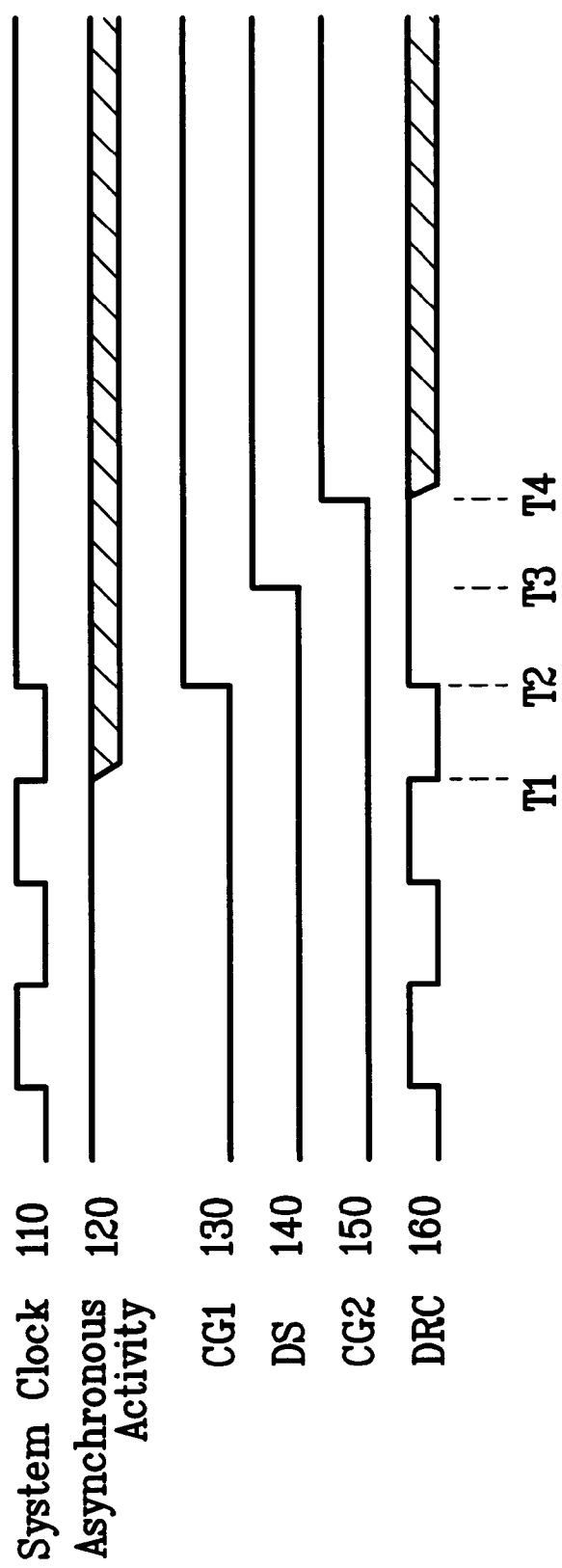

METHOD AND CIRCUITRY FOR SWITCHING FROM A SYNCHRONOUS MODE OF OPERATION TO AN ASYNCHRONOUS MODE OF OPERATION WITHOUT ANY LOSS OF DATA

The present invention relates to computer systems, and more particularly, to a method and apparatus for alternating between a clock and an asynchronous event without loss of data during such changes.

BACKGROUND OF THE INVENTION

It is now common for computers to be equipped with interface ports or communication buses. These buses exist for enabling communication between devices such as a host computer and one or more peripheral devices such as external disk drives, printers, and the like. Additionally, it is common for a peripheral device to utilize digital application specific integrated circuits ("ASICs") to receive data from or send data to other devices such as host computers. As the focus of the present invention is on an ASIC for a peripheral device, the peripheral device will be considered the internal device for illustrative purposes.

Each digital ASIC has at least one internal system clock. The system clock determines the speed at which the ASIC performs logic operations. When the ASIC is running on the system clock, internal registers receive data from the microprocessor operating off of the system clock or from an external device operating asynchronously. While the system clock is operating, external (asynchronous) signals used to access or update the ASIC are synchronized to the system clock. To save power, however, the system clock can be turned off, i.e., when the peripheral device goes into low-power mode. When the ASIC is in low-power mode, all accesses from the external device must be executed asynchronously.

A potential problem exists, however, when switching from synchronous operation to asynchronous operation because there is a delay of approximately 3 to 4 clock cycles for an external event to be synchronized to the system clock. This delay is referred to as the "synchronization time."

If the ASIC is switched from synchronous (clocked) to asynchronous operation during the synchronization time, data being sent from an external device to one of the ASIC's internal registers may be lost. It is, therefore, desirable to provide an ASIC that does not lose any data as a result of a switch from synchronous operation to asynchronous operation.

SUMMARY OF THE INVENTION

Circuitry that receives data on an asynchronous communications bus from an external device and receives data from a synchronous internal device is provided. The circuitry, which preferably is an integrated circuit chip, is capable of switching from synchronous operation to asynchronous operation without any loss of data.

The circuitry comprises: a register for receiving the data from the communications bus and for receiving the data from the internal device; event detection and synchronization logic for determining if there is activity on the communications bus and synchronizing such activity if detected during asynchronous operation; data capture and multiplexing logic for capturing data from the communications bus and transmitting the captured data to the register during synchronous operation; and clock switching logic.

The circuitry operates off of a system clock and each event of the activity on the communications bus has both asynchronous data and an asynchronous event signal. The clock switching logic allows the register to be updated with the system clock when the system clock is on, and when no activity on the communications bus is detected, switches the system clock off and enables the asynchronous event signal from the communications bus to update the register. Additionally, the circuitry does not switch off the system clock while there is activity on the communications bus from the external device.

Preferably, with the circuitry of the present invention, the communications bus has a minimum event time greater than the time for one and a half cycles of the system clock plus enough timing margin for an asynchronous update to occur.

A method of switching the operation of an integrated circuit chip from synchronous operation to asynchronous operation without losing any data from an external communications bus also is disclosed. The method comprises the following steps: when the chip receives a request to switch to a low-power mode from a device in which the chip operates, sampling the communications bus for any activity, each event of which has both asynchronous data and an asynchronous event signal; if activity is detected; remaining in a normal-power mode until the activity is synchronized and completed; and when no activity on the communications bus is detected, switching to low-power mode.

Preferably, the step of switching to low-power mode comprises the following steps: turning off a system clock, which runs at least one register on the chip; selecting any data from the communications bus to feed to the at least one register, the data being part of any activity on the communications bus that takes place since beginning to switch to low-power mode; and for each event, enabling the asynchronous event signal to update the register.

BRIEF DESCRIPTION OF THE DRAWINGS

FIG. 2 is a timing diagram for the present invention covering the time of a switch from synchronous operation to asynchronous operation.

DETAILED DESCRIPTION OF THE PREFERRED EMBODIMENTS

Figure 1:
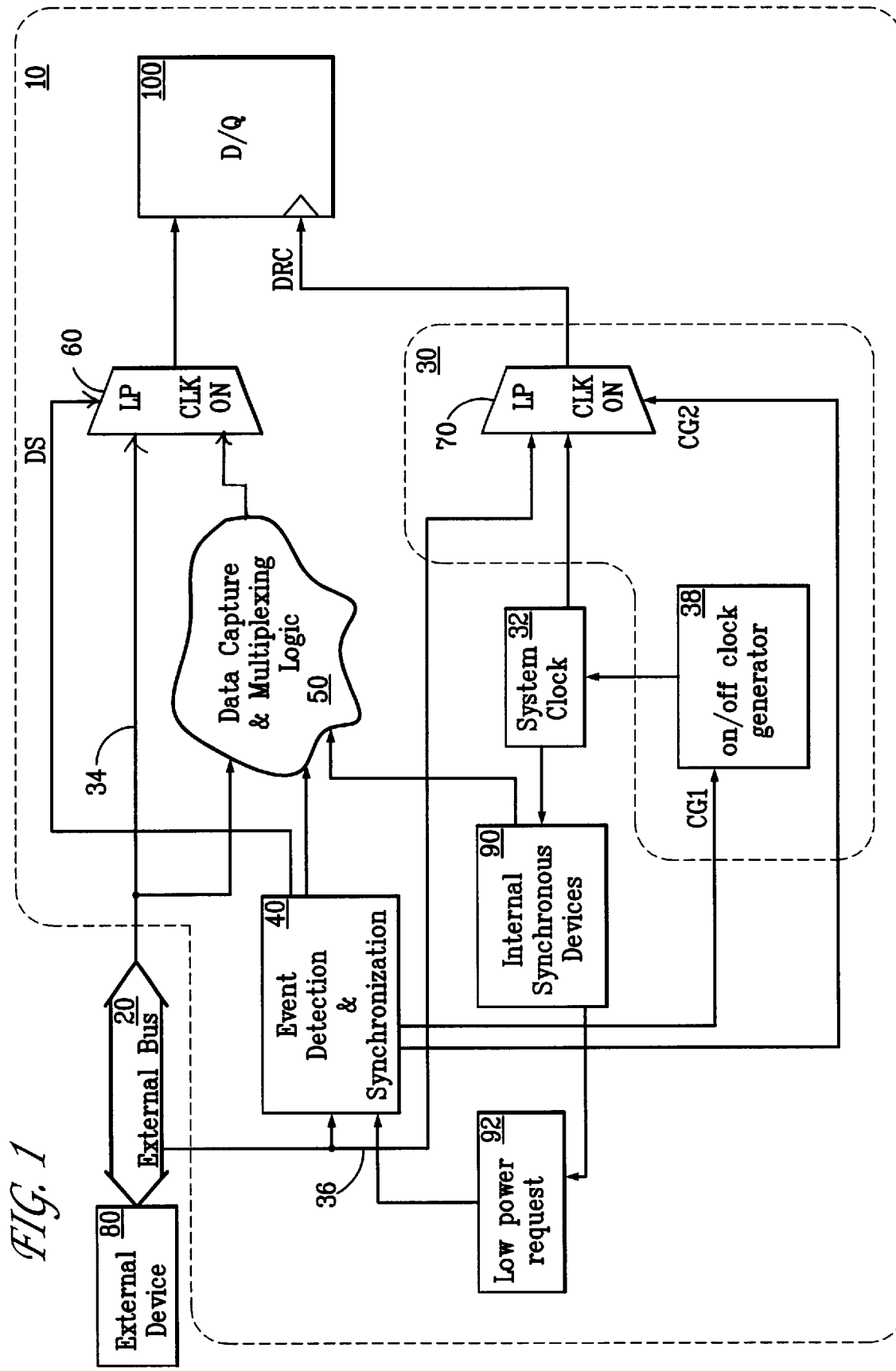
FIG. 1 is a flow diagram of the present invention.

The term "event" refers to a signal from one device to another. For example, a peripheral device will detect an event from a host computer when the host computer decides to access the device such as when writing to or reading from the peripheral device. This event can occur at any time, and is thus, referred to as an "asynchronous event."

As is known in the art, just prior to an event, the signal from the host computer will either rise to a high state (value of 1) or fall to a low state (value of 0), resulting in a leading edge of the event, data of which is transmitted on the trailing edge of the event. For illustrative purposes, the following description addresses the situation in which a communications bus has no activity in the high state. Accordingly, the signal from this bus will drop to a low state, thus signaling the beginning of an event.

In addition, for every communications bus, there is a minimum length of time between the leading edge and the trailing edge of an event. This minimum length of time is based on the protocol and timing specifications of the bus. The present invention uses the leading edge of the event to carefully control the timing of when a peripheral device shifts into low-power mode.

For the switch from synchronous operation of a peripheral device to asynchronous operation to occur without any loss of data, certain requirements must be met. For example, once an event has begun prior to switching to low-power mode, the event must complete while the system clock is still operating. If the event does not complete before the switch is made, then the data being transmitted on the trailing edge of the event will be lost. Similarly, if the switch to low-power mode is made and the leading edge of an asynchronous event occurs after that time, the entire switch to asynchronous operation must complete before the trailing edge of the event because the event must be captured asynchronously to prevent loss of the data being transmitted on that trailing edge.

FIG. 1 shows a flow diagram for the digital ASIC 10 according to the present invention. The digital ASIC 10 is designed to handle the situation when the decision to switch into low-power mode and shut off the system clock 32 has been made. The ASIC 10 comprises event detection and synchronization logic 40, data capture & multiplexing logic 50 and clock-switching logic 30 to prevent the ASIC 10 from switching to low power mode when there is activity on the communications bus 20 from the external device 80. By doing so, the event detection and synchronization logic 40 prevents the system clock 32 that drives the chip 10 from being gated off from running the ASIC's register 100 when there is asynchronous activity on the external communications bus 20. Although an ASIC 10 may have several registers, for illustrative purposes, the ASIC 10 of FIG. 1 has one register 100, which can be updated by either internal synchronous devices 90 or by an external device 80.

Shown in FIG. 1 is a schematic representation of internal synchronous devices 90, including the microprocessor of the peripheral device, which issues the low-power request 92. Also shown in FIG. 1 are switches 60 and 70 (described below), where the "low-power" state is represented as "LP" and the "clock on" state is represented as "CLK ON."

As soon as there is a break in the asynchronous activity, however, the system clock 32 can be gated off and the external asynchronous data 34 fed into the register 100. The actual switch from synchronous operation to asynchronous operation occurs by gating off the system clock 32, selecting any new external asynchronous data 34, and then enabling the asynchronous event signal 36 to update the register 100.

The event detection and synchronization logic 40 detects an asynchronous event by sampling the incoming external bus for activity (leading edge of an event) at every cycle of the system clock 32. When the asynchronous event is detected, the circuitry prevents the switch to low-power mode until the detected asynchronous event is synchronized and completed, after which the switch to low-power mode is allowed unless another asynchronous event is detected. When no asynchronous event is detected and there is a request 92 to go into low-power mode, the switch to low-power mode is allowed to occur.

FIG. 2 shows a timing diagram for the ASIC 10 covering the time of a switch from synchronous operation to asynchronous operation. After the event detection and synchronization logic 40 detects no activity on the external bus 20, FIG. 2 helps illustrate the sequence of events.

Starting from the top of FIG. 2, the following signals are represented: the first signal 110 is that of the system clock 32; the second signal 120 is that of asynchronous activity from the external bus 20; the third signal 130 is that of clock gate 1, (CG1) as shown in FIG. 1; the fourth signal 140 is the data select signal (DS), which selects which source of data to feed the register 100; the fourth signal 150 is that of clock gate 2 (CG2); and the sixth signal 160 is that of the data register clock (DRC).

Referring to FIG. 2, prior to time T1, the system clock is "ON" and no activity is detected, as shown on the asynchronous event signal 120. This inactivity is detected by the event detection and synchronization logic 40 and the signal is sent to the clock generator 38 to turn the system clock 32 off, i.e., as part of placing the peripheral device into low-power mode. At time T2, signal 130 at clock gate 1 (CG1) receives the signal to turn off the system clock 32 and start the process of switching from synchronous operation to asynchronous operation one-half cycle after the inactivity is detected at time T1.

The event detection and synchronization logic 40 then sends the signal to the data source switch 60 to select the external asynchronous data 34. This data select signal 140 is received at time T3, i.e., one cycle after the inactivity is detected at time T1.

The event detection and synchronization logic 40 then sends the signal to the clock source switch 0 to enable the asynchronous event signal 36 to update the registers 100. This signal 150, clock gate 2 (CG2), occurs at time T4, i.e., one cycle after the process of switching from synchronous operation to asynchronous operation began at time T2. Thus, the data register clock (DRC) receives the signal 160, enabling the asynchronous event signal 36 to update the register 100 with any asynchronous event (signal 120) at time T4, one cycle after the switch began.

In the sample timing diagram of FIG. 2, the asynchronous event signal 120 is shown to represent that at some time after time T1, an event may occur. When the switch to low-power mode is made at time T2, enabling the asynchronous event signal 36 to update the register 100 will occur at time T4. The data of the asynchronous event will not be lost, however, because the switch to asynchronous operation only takes one clock cycle; the register 100 will reliably capture the trailing edge of the event when the minimum time for the event is greater than one and a half clock cycles plus enough timing margin for an asynchronous update to occur. As is known in the art, this timing margin depends on the speed of the semiconductor technology on the ASIC 10 and the length of the logic paths to the register 100.

For the communications bus contemplated in the preferred embodiment of the invention, i.e., an ATA bus (AT Attachment bus), the minimum length of time between the leading edge and the trailing edge of an event is 70 nanoseconds. In this embodiment, the frequency of the system clock is 32 MHZ. This ratio of the frequency of the system clock to the minimum length of time of the event is a preferred, approximate, minimum ratio, i.e., increases in the frequency of the system clock are preferable. Thus, with the present invention, even if after the switch to low-power mode is made and the leading edge of an asynchronous event occurs after that time, the entire switch to asynchronous operation will complete before the trailing edge of the event because the switch takes only 1½ cycles of the system clock 32 (plus enough timing margin) to effect the switch. Accordingly, this is true for every communications bus with a minimum event time greater than the time of one and a half cycles of the system clock (plus enough timing margin).

It is to be understood that even though numerous characteristics and advantages of the present invention have been set forth in the foregoing description, together with details of the structure and function of the invention, the disclosure is illustrative only.

Accordingly, changes may be made in detail, especially in matters of shape, size and arrangement of parts within the principles of the invention to the full extent indicated by the broad general meaning of the terms in which the appended claims are expressed.

What is claimed is:

1. Circuitry that receives data on an asynchronous communications bus from an external device and receives data from asychronous internal device, and is capable of switching from synchronous operation to asynchronous operation without any loss of data, the circuitry comprising:

a register for receiving the data from the communications bus and for receiving the data from the internal device;

event detection an synchronization logic for determining if there is activity on the communications bus, each event of the activity on the communication bus having both asynchronous data and an asynchronous event signal, and synchronizing such activity if detected during asynchronous operation;

data capture and multiplexing logic for capturing data from the communications bus and transmitting the captured data to the register during synchronous operation; and clock switching logic, where the circuitry operates off of a system clock, the clock switching logic allowing the register to be updated with the system clock when the system clock is on, and when no activity on the communications bus is detected, switching the system clock off and enabling the asynchronous event signal from the communications bus to update the register, wherein the circuitry does not switch off the system clock while there is activity on the communications bus from the external device, wherein the communications bus has a minimum event time greater than the time for one and a half cycles of the system clock plus enough timing margin for an asynchronous update to occur.

2. The circuitry of claim 1, wherein the circuitry is an integrated circuit chip.

3. The method of switching the operation of an integrated circuit chip from synchronous operation to asynchronous operation without losing any data from an external communications bus, the method comprising the following steps:

when the chip receives a request to switch to a low-power mode from a device in which the chip operates, sampling the communication bus for any activity, each event of which has both asynchronous data and an asynchronous event signal, wherein:

if activity is detected, remaining in a normal-power mode until the activity is synchronized and completed; and when no activity on the communications bus is detected, switching to low-power mode, wherein the communications bus has a minimum event time greater than the time for one and a half cycles of he system clock plus enough timing margin for an asynchronous update to occur.

4. The method of claim 3, wherein switching to low-power mode comprises the following steps:

turning off a system clock, which runs at least one register on the chip;

selecting any data from the communications bus to feed to the at least one register, the data being part of any activity on the communications bus that takes place since beginning to switch to low-power mode; and for each event, enabling the asynchronous event signal to update the register.

5. The method of operating an Application Specific Integrated Circuit (ASIC) for a peripheral device which receives said data on a communication bus from a host computer, including asynchronous event signals, said ASIC including registers, a clock for synchronizing the input of said data to said registers, and a low power request for turning said clock off, said method comprising:

if one of said asynchronous event signals on said communication bus is detected, remaining in a normal-power mode until said data is synchronized and said input of said data into said register is completed; and when no asynchronous event signals on said communications bus are detected, turning said clock off in response to said low power request, wherein the communications bus has a minimum event time greater than the time for one and a half cycles of the system clock plus enough timing margin for an asynchronous update to occur.

6. The method recited in claim 5 wherein after said step of turning said clock off, asynchronously applying data on said communication bus to at least one of said registers.

7. The method recited in claim 6 wherein the time required to switch from synchronous to asynchronous operation is smaller than the time from said asynchronous event signal to the leading edge of said data.

* * * * *

UNITED STATES PATENT AND TRADEMARK OFFICE
CERTIFICATE OF CORRECTION

| | | |
|---|---|---|
| PATENT NO. | : 6,715,095 B1 | Page 1 of 1 |
| APPLICATION NO. | : 09/677390 | |
| DATED | : March 30, 2004 | |
| INVENTOR(S) | : Troy Larsen and Martin Culley | |

It is certified that error appears in the above-identified patent and that said Letters Patent is hereby corrected as shown below:

Title page,
(73) Assignee: delete "Iomeca Corporation" and insert --Iomega Corporation--.

Signed and Sealed this

Nineteenth Day of December, 2006

JON W. DUDAS
*Director of the United States Patent and Trademark Office*